United States Patent
Locker et al.

(10) Patent No.: US 11,816,176 B2
(45) Date of Patent: Nov. 14, 2023

(54) SYSTEMS AND METHODS FOR ENHANCING ONLINE SHOPPING EXPERIENCE

(71) Applicant: Locker 2.0, Inc., Glendale, CA (US)

(72) Inventors: Kristine Elizabeth Locker, Glendale, CA (US); Jerry Jen-Fu Wang, Arcadia, CA (US); Kevin Chun-Hsin Lin, Arcadia, CA (US)

(73) Assignee: Locker 2.0, Inc., Glendale, CA (US)

( * ) Notice: Subject to any disclaimer, the term of this patent is extended or adjusted under 35 U.S.C. 154(b) by 0 days.

(21) Appl. No.: 17/443,747

(22) Filed: Jul. 27, 2021

(65) Prior Publication Data

US 2023/0031877 A1 Feb. 2, 2023

(51) Int. Cl.
*G06F 16/958* (2019.01)
*G06F 9/445* (2018.01)
*G06F 16/957* (2019.01)
*G06F 16/9535* (2019.01)

(52) U.S. Cl.
CPC ........ *G06F 16/958* (2019.01); *G06F 9/44526* (2013.01); *G06F 16/9535* (2019.01); *G06F 16/9577* (2019.01)

(58) Field of Classification Search
None
See application file for complete search history.

(56) References Cited

U.S. PATENT DOCUMENTS

| | | | | |
|---|---|---|---|---|
| 6,701,350 B1* | 3/2004 | Mitchell | ............. | G06F 16/9562 709/217 |
| 7,386,798 B1* | 6/2008 | Heikes | ................ | G06F 3/04817 715/752 |
| 8,234,168 B1* | 7/2012 | Lagle Ruiz | ........ | G06Q 30/0267 705/14.64 |
| 8,392,538 B1* | 3/2013 | Lee | ........................ | G06F 16/958 709/219 |
| 9,589,184 B1* | 3/2017 | Castillo | .................... | G06F 40/30 |
| 9,805,408 B2* | 10/2017 | Whisnant | ............... | G06Q 50/01 |
| 9,965,792 B2* | 5/2018 | Whisnant | ........... | G06Q 30/0631 |
| 10,109,003 B1* | 10/2018 | Jenkins | .............. | G06Q 30/0633 |
| 10,140,625 B2 | 11/2018 | Hudson et al. | | |
| 10,152,199 B2* | 12/2018 | Wilson | .................... | G06F 9/451 |
| 10,229,424 B1* | 3/2019 | Liu | ......................... | G06Q 30/02 |

(Continued)

OTHER PUBLICATIONS

Jack Loyd, How to Install the Pinterest "Pin It" Button, wikiHow, published: Jun. 3, 2021, retrieved: https://www.wikihow.com/Install-the-Pinterest-%22Pin-It%22-Button (Year: 2021).*

*Primary Examiner* — Howard Cortes
(74) *Attorney, Agent, or Firm* — Lewis Roca Rothgerber Christie LLP

(57) ABSTRACT

A system for adding an external function to a webpage includes: one or more processors; and memory communicably connected to the one or more processors and storing instructions that, when executed by the one or more processors, cause the one or more processors to: receive code associated with the webpage from a remote server; identify a plurality of images in the code; filter the plurality of images to identify a first type of image different from other images of the plurality of images; and append the external function to the first type of image to display a modified webpage including the external function on a display device of a first user.

18 Claims, 12 Drawing Sheets

(56) References Cited

U.S. PATENT DOCUMENTS

| | | | |
|---|---|---|---|
| 10,467,237 B1* | 11/2019 | Silbermann | G06F 16/248 |
| 10,515,140 B1* | 12/2019 | Scott | G06F 40/134 |
| 10,614,476 B2 | 4/2020 | Hudson et al. | |
| 10,679,233 B2 | 6/2020 | Hudson et al. | |
| 10,685,368 B1 | 6/2020 | Hudson et al. | |
| 10,719,843 B2 | 7/2020 | Hudson et al. | |
| 10,726,437 B2 | 7/2020 | Hudson et al. | |
| 10,748,206 B1* | 8/2020 | Cooper | G06Q 20/12 |
| 10,798,089 B1* | 10/2020 | Benkreira | H04L 63/123 |
| 10,818,042 B1* | 10/2020 | Tang | G06K 9/00832 |
| 11,017,263 B2* | 5/2021 | Kim | G06K 9/209 |
| 11,055,343 B2* | 7/2021 | Xu | G06F 3/0488 |
| 11,120,362 B2* | 9/2021 | Zholudev | G06N 20/00 |
| 11,210,730 B1* | 12/2021 | Woodyard | G06Q 30/0643 |
| 2003/0135820 A1* | 7/2003 | Aasman | G06F 16/9562 |
| | | | 715/206 |
| 2005/0162523 A1* | 7/2005 | Darrell | G06F 16/951 |
| | | | 348/211.2 |
| 2007/0073777 A1* | 3/2007 | Werwath | G06F 16/9577 |
| 2007/0271155 A1* | 11/2007 | Rouda | G06Q 30/0601 |
| | | | 705/26.1 |
| 2009/0034851 A1* | 2/2009 | Fan | G06F 16/583 |
| | | | 382/230 |
| 2009/0234876 A1* | 9/2009 | Schigel | H04L 51/02 |
| 2009/0287655 A1* | 11/2009 | Bennett | G06F 16/58 |
| 2010/0306307 A1* | 12/2010 | Baessler | G06F 16/986 |
| | | | 709/203 |
| 2012/0110474 A1* | 5/2012 | Chen | G06F 3/048 |
| | | | 715/753 |
| 2012/0246552 A1* | 9/2012 | Liu | G06F 16/951 |
| | | | 715/234 |
| 2012/0260158 A1* | 10/2012 | Steelberg | G06Q 30/02 |
| | | | 715/234 |
| 2013/0185155 A1* | 7/2013 | Colando | G06Q 30/0256 |
| | | | 705/14.54 |
| 2013/0311875 A1* | 11/2013 | Pappas | G06F 40/143 |
| | | | 715/234 |
| 2014/0095463 A1* | 4/2014 | Pappas | G06F 16/951 |
| | | | 707/706 |
| 2014/0214559 A1* | 7/2014 | Hu | G06Q 30/0277 |
| | | | 705/14.73 |
| 2014/0237335 A1* | 8/2014 | Liang | H04L 67/306 |
| | | | 715/205 |
| 2015/0066684 A1* | 3/2015 | K. V | G06Q 30/0631 |
| | | | 705/26.7 |
| 2015/0073922 A1* | 3/2015 | Epperson | G06Q 30/0277 |
| | | | 705/14.73 |
| 2015/0302449 A1* | 10/2015 | Akbarpour | G06Q 30/0643 |
| | | | 705/14.23 |
| 2016/0140491 A1* | 5/2016 | Forgatch | G06Q 10/087 |
| | | | 705/7.29 |
| 2017/0109609 A1* | 4/2017 | Hill | G06K 9/6215 |
| 2017/0323020 A1* | 11/2017 | Bosarge | G06F 16/9535 |
| 2018/0005292 A1* | 1/2018 | Bell | G06Q 30/0625 |
| 2018/0025012 A1* | 1/2018 | Cao | G06F 16/287 |
| | | | 707/740 |
| 2018/0108054 A1* | 4/2018 | Doubinski | G06Q 30/0601 |
| 2018/0121470 A1* | 5/2018 | Grossman | G06F 16/5866 |
| 2018/0150869 A1* | 5/2018 | Finnegan | G06Q 30/0239 |
| 2018/0239826 A1* | 8/2018 | Epstein | G06F 16/958 |
| 2018/0276727 A1* | 9/2018 | Patel | G06Q 30/0625 |
| 2018/0276731 A1* | 9/2018 | Patel | G06K 9/6267 |
| 2019/0043095 A1* | 2/2019 | Grimaud | G06F 16/906 |
| 2019/0114700 A1* | 4/2019 | Van Geldrop | G06F 3/04817 |
| 2019/0278815 A1* | 9/2019 | Capon | G06F 16/00 |
| 2019/0281059 A1* | 9/2019 | Chittampally | G06F 16/958 |
| 2019/0318409 A1* | 10/2019 | Vallelunga | G06Q 30/0631 |
| 2019/0325498 A1* | 10/2019 | Clark | G06K 7/1417 |
| 2020/0042506 A1* | 2/2020 | Grigorov | G06F 16/217 |
| 2020/0151499 A1* | 5/2020 | Kumar | G06V 20/10 |
| 2020/0372560 A1* | 11/2020 | Dahl | G06F 16/51 |
| 2021/0042812 A1* | 2/2021 | Locks | G06Q 30/0613 |
| 2021/0117492 A1* | 4/2021 | Chandra | G06F 16/9535 |
| 2021/0374396 A1* | 12/2021 | Castillo | G06F 16/957 |
| 2022/0121884 A1* | 4/2022 | Zadeh | G06K 9/6264 |

\* cited by examiner

SYSTEMS AND METHODS FOR ENHANCING ONLINE SHOPPING EXPERIENCE

BACKGROUND

1. Field

Aspects of one or more embodiments of the present disclosure relate to systems and methods for recommending products offered on webpages, and more particularly, to a browser plugin/extension for appending a recommendation function to a product image of a product offered on the webpages, and methods including the same.

2. Description of Related Art

Browser plugins and extensions add various functions to a browser to enable the browser to manage internet content that the browser is not designed to process. For example, a browser plugin or extension may add a functionality to a browser to modify content and/or a user experience of a webpage displayed via the browser on a user device. The webpage may be hosted on a webpage server in communications with the browser, and may be managed by a third party content provider. Because webpages may be managed by the third party content provider, the browser may not know or may not have control over the content and/or functionality provided by the webpages. Accordingly, a user of the user device may add various desired functionalities to a browser by installing one or more suitable browser plugins or extensions for the browser.

The above information disclosed in this Background section is for enhancement of understanding of the background of the present disclosure, and therefore, it may contain information that does not constitute prior art.

SUMMARY

One or more embodiments of the present disclosure are directed to systems and methods for appending an external function (e.g., a recommendation function) to a first type of image (e.g., a product image) from among a plurality of images of a webpage.

According to one or more embodiments of the present disclosure, a system for adding an external function to a webpage includes: one or more processors; and memory communicably connected to the one or more processors and storing instructions that, when executed by the one or more processors, cause the one or more processors to: receive code associated with the webpage from a remote server; identify a plurality of images in the code; filter the plurality of images to identify a first type of image different from other images of the plurality of images; and append the external function to the first type of image to display a modified webpage including the external function on a display device of a first user.

In an embodiment, to filter the plurality of images, the instructions may further cause the one or more processors to: compare a link of each of the plurality of images with one or more links stored in a data store; identify a matching link with the one or more links; and determine that an image associated with the matching link from among the plurality of images is the first type of image.

In an embodiment, to filter the images, the instructions may further cause the one or more processors to: evaluate a plurality of links of the plurality of images; identify a product attribute in a link from among the plurality of links; and determine that an image associated with the link including the product attribute is the first type of image.

In an embodiment, the instructions may further cause the one or more processors to: identify a selection of the external function appended to the first type of image; receive a unique identifier of a second user from the selected external function; identify a link associated with the webpage containing the first type of image; and transmit the link to the second user based on the unique identifier.

In an embodiment, the unique identifier may include an email or a username associated with the second user.

In an embodiment, to receive the unique identifier of the second user, the instructions may further cause the one or more processors to: identify a list of unique identifiers associated with the first user; display the list of unique identifiers in the selected external function; and receive a selection of the unique identifier of the second user from the list of unique identifiers.

In an embodiment, to receive the unique identifier of the second user, the instructions may further cause the one or more processors to: identify a list of known unique identifiers associated with the first user; compare the received unique identifier with the list of known unique identifiers; and transmit the link to the second user in response to identifying a match of the received unique identifier with the list of known unique identifiers.

In an embodiment, the external function may be a part of an extension or a plugin of a browser.

In an embodiment, the external function may include a link to a functionality for the extension or plugin.

In an embodiment, the link may include an icon appended to the first type of image.

According to one or more embodiments of the present disclosure, a method for adding an external function to a webpage includes: receiving, by a processor including an internet browser, code associated with the webpage from a remote server; identifying, by the processor, a plurality of images in the code; filtering, by the processor, the plurality of images to identify a first type of image different from other images of the plurality of images; and appending, by the processor, the external function to the first type of image to display a modified webpage including the external function on a display device of a first user.

In an embodiment, the filtering of the plurality of images may include: comparing, by the processor, a link of each of the plurality of images with one or more links stored in a data store; identifying, by the processor, a matching link with the one or more links; and determining, by the processor, that an image associated with the matching link from among the plurality of images is the first type of image.

In an embodiment, the filtering of the images may include: evaluating, by the processor, a plurality of links of the plurality of images; identifying, by the processor, a product attribute in a link from among the plurality of links; and determining, by the processor, that an image associated with the link including the product attribute is the first type of image.

In an embodiment, the method may further include: identifying, by the processor, a selection of the external function appended to the first type of image; receiving, by the processor, a unique identifier of a second user from the selected external function; identifying, by the processor, a link associated with the webpage containing the first type of image; and transmitting, by the processor, the link to the second user based on the unique identifier.

In an embodiment, the unique identifier may include an email or a username associated with the second user.

In an embodiment, the receiving of the unique identifier of the second user may include: identifying, by the processor, a list of unique identifiers associated with the first user; displaying, by the processor, the list of unique identifiers in the selected external function; and receiving, by the processor, a selection of the unique identifier of the second user from the list of unique identifiers.

In an embodiment, the receiving of the unique identifier of the second user may include: identifying, by the processor, a list of known unique identifiers associated with the first user; comparing, by the processor, the received unique identifier with the list of known unique identifiers; and transmitting, by the processor, the link to the second user in response to identifying a match of the received unique identifier with the list of known unique identifiers.

In an embodiment, the external function may be a part of an extension or a plugin of the browser.

In an embodiment, the external function may include a link to a functionality for the extension or plugin.

In an embodiment, the link may include an icon appended to the first type of image.

BRIEF DESCRIPTION OF THE DRAWINGS

The above and other aspects and features of the present disclosure will be more clearly understood from the following detailed description of the illustrative, non-limiting example embodiments with reference to the accompanying drawings.

DETAILED DESCRIPTION

Figure 1:
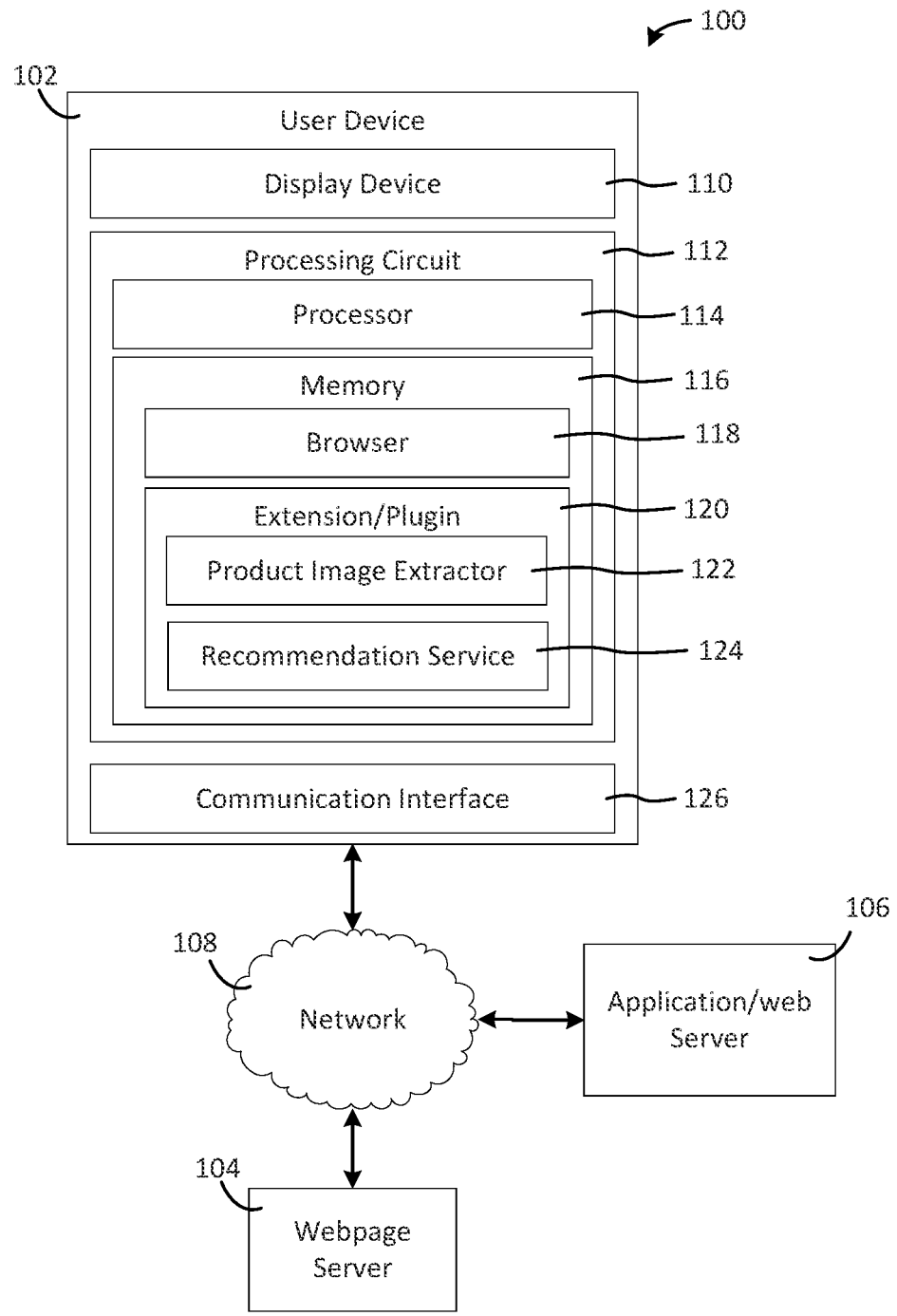
FIG. 1 illustrates a block diagram of a recommendation system 100 according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices (e.g., device, processing circuit, server, and/or the like) and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more example embodiments of the present disclosure may be directed to a browser plugin/extension for adding a recommendation function (e.g., an external function) to a product image (e.g., a first type of image) of a webpage. Generally, images of a webpage may be hosted by a webpage server, such that the images may be retrieved by a browser of a user device via a Uniform Resource Locator (URL) and/or an image file name of the image contained in the hypertext markup language (HTML) and/or extensible markup language (XML) of the webpage. While the images of a webpage may be identified via an image tag or an image file extension in the HTML and/or XML of the webpage, the image content and/or purpose of the image may not be easily identified, as different content providers may use different naming conventions, file structures, and/or the like to designate different types of images for different purposes. For example, a webpage may include various different types of images such as logo images, banner images, button images, thumbnail images, product images, and/or the like, which may be hosted by the webpage server and managed by a third party content provider. Accordingly, it may be difficult to identify the product images contained in a webpage from among the various different types of images contained in the webpage. As used herein, a product image is an image of a product featured or offered on a webpage (e.g., a product webpage).

Thus, while some browser plugins and extensions may append a share function to images on a webpage, they may be unable to distinguish between different types of images of different webpages that are managed by different third party content providers. Therefore, these browser plugins and extensions may append the share function to all of or most of the images contained in a webpage, irrespective of the type or content of the images, which may reduce the aesthetics and/or user experience of the webpage.

According to one or more embodiments of the present disclosure, a system including a browser plugin/extension and a method thereof may be provided that may identify and distinguish a first type of image (e.g., a product image or other desired image type) from other images contained in a webpage, and may append an external function (e.g., a recommendation function or other suitable function that the browser is not designed to perform) to the product image (or other desired image type) while omitting the recommendation function on the other images (e.g., non-product images) contained in the webpage. The recommendation function may enable the user to save a particular product image for later retrieval of a product webpage containing the product image, and/or may enable the user to recommend a particular product image to another user, such that the other user may later retrieve the product webpage containing the product image via the recommendation.

The systems and methods described herein improve computer-related technologies by performing certain processes and methods that cannot be done by conventional browsers or human actors. For example, the systems and methods described herein provide a technical solution to a problem that is necessarily rooted in internet-centric technologies, that is, the ability to add a functionality to a browser in order to distinguish certain images from other images contained in a webpage managed by a third party, and to append the external function to only the certain images of the webpage in real or near real time (e.g., in response to an HTTP POST from the webpage server hosting the webpage) while omitting the external function on the other images contained in the webpage. In some embodiments, the external function (e.g., the recommendation function) may provide a link to an application/web server to enable various functionalities of the browser plugin/extension, which cannot be performed by a browser alone, for example, such as collecting recommendations via the browser plugin/extension from various webpages, and transmitting recommendations to other known users while preventing or substantially preventing the user from providing (e.g., from spamming) the recommendation to unknown users. Accordingly, functionalities of a browser may be improved, and aesthetics and/or a user experience of a webpage that is managed by a third party content provider and displayed by the browser may be improved.

For convenience of description, while product images are described in more detail hereinafter as a desired image type (e.g., a first type of image) to be distinguished from other image types, the present disclosure is not limited thereto, and any desired image type from among the various different types of images contained in a requested webpage may be distinguished such that a suitable external function (e.g., a recommendation function) may be appended to the desired image type while omitting the suitable function on other images contained in the webpage.

FIG. 1 illustrates a block diagram of a recommendation system 100 according to one or more embodiments of the present disclosure.

Referring to FIG. 1, the recommendation system 100 may include a user device 102 that is communicably connected to a webpage server 104 and an application/web server 106 over a communications network 108. A browser 118 of the user device 102 may communicate with the webpage server 104 over the communications network 108 to request a webpage to be displayed on a display device 110 connected to or included in the user device 102. The browser 118 may include any suitable internet browser, for example, such as Chrome®, Internet Explorer®, Firefox®, Safari®, Opera®, and the like. However, the present disclosure is not limited thereto, and in other embodiments, the user device 102 may include any suitable program, application, widget, user interface, and/or the like to enable the user device 102 to access the webpage server 104 to request content (e.g., webpages) to be displayed on the display device 110 associated with (e.g., connected to or included in) the user device 102.

The user device 102 may include a processing circuit 112 having a processor 114 and memory 116, and a communication interface 126 for communicating with the webpage server 104 and/or the application/web server 106 over the communications network 108. In various embodiments, the processor 114 may include a general-purpose processor, an Application Specific Integrated Circuit (ASIC), one or more Field Programmable Gate Arrays (FPGAs), a Digital Signal Processor (DSP), any other suitable electronic processing components, or combinations thereof. The memory 116 may include tangible, non-transient, volatile memory or non-volatile memory, for example, such as Random Access Memory (RAM), Read-Only Memory (ROM), Non-volatile RAM (NVRAM), Flash Memory, hard disk storage, any other suitable electronic storage medium, or combinations thereof. The memory 116 stores instructions (e.g., data, computer code, and/or programming logic) that, when executed by the processor 114, controls the operations of the user device 102. Accordingly, the memory 116 includes database components, object code components, script components, and/or any other type of information structure for supporting the various activities and information structures described herein.

As shown in FIG. 1, in some embodiments, the memory 116 includes the browser 118 and a browser extension/plugin 120. The browser 118 communicates with the webpage server 104 over the communications network 108 (e.g., via the communication interface 126) to request one or more webpages for display on the display device 110. For example, the browser 118 may transmit (e.g., via a URL, an IP address, and/or the like) a request (e.g., HTTP GET) to the webpage server 104 for a requested webpage, and may receive a response (e.g., HTTP POST) from the webpage server 104 including code (e.g., HTML, XML, and/or the like) corresponding to the requested webpage. The browser 118 interprets the code, retrieves any images according to the code (e.g., according to URLs or other suitable links to the images contained in the code), and displays the requested webpage including the retrieved images on the display device 110 according to the code.

The extension/plugin 120, which may be installed (e.g., loaded or downloaded) into the memory 116, may include a product image extractor 122 and a recommendation service 124. In brief overview, the product image extractor 122 may identify a product image (or other desired image) from among a plurality of images contained in the requested webpage, and may append a recommendation function (e.g., a recommendation button, icon, link and/or the like) to the product image (e.g., to only the product images), while omitting the recommendation function on other images contained in the requested webpage. The recommendation function may provide a link to the application/web server 106 to enable or enhance a functionality of the extension/plugin 120. For example, when the user (e.g., a first user or a recommendor) selects a recommendation function of a product image, the recommendation service 124 may be invoked to communicate and exchange data with the application/web server 106 over the communications network 108, for example, such as to save a selected product image, and/or to provide a recommendation of a product webpage containing the selected product image to another user (e.g., to a second user or a recommendee). In other words, the recommendation service 124 may request user information and data from the application/web server 108, and may provide user inputs to the application/web server 108. The product image extractor 122 and the recommendation service 124 will be described in more detail below.

The webpage server 104 may host webpages that are managed by a third party content provider. In some embodiments, the webpage server 104 may host webpages that are managed by various different third party content providers, for example, such as a web host, or may be a webpage server located at a data center of a particular third party content provider to host webpages of the particular third party content provider. The webpage server 104 may host and serve various webpages that are managed by one or more third party content providers, and may provide the webpages to the browser 118 over the communications network 108 upon request (e.g., HTTP GET via a URL or other suitable link).

The application/web server 106 may include one or more application servers, web servers, data stores, and/or the like, and may facilitate the various processes and/or functionalities of the extension/plugin 120. In some embodiments, the application/web server 106 may host an application page, a webpage, a dashboard, a user interface, and/or the like that may be accessible via the browser 118 or a separate application installed on the user device 102 to enable the user to manage interactions with the extension/plugin 120 and/or other users. For example, the application page, the webpage, the dashboard, the user interface, and/or the like may provide an interface to the user to manage saved product images that have been collected from various webpages, revisit various product webpages containing the saved product images (e.g., via a URL or other suitable link), manage collections (e.g., categories or containers of saved product images), review recommendations, communicate with other users, manage friends (e.g., potential recommendees), and/or the like. In some embodiments, the application/web server 106 may manage and store various user information and data, and may provide the user information and data to the extension/plugin 120.

The communication interface 126 may be or include wired or wireless communications interfaces (e.g., jacks, antennas, transmitters, receivers, transceivers, wire terminals, and/or the like) for conducting data communications with the webpage server 104 and/or the application/web server 106. In various embodiments, communications via the communication interface 126 can be direct (e.g., local wired or wireless communications) or via the communications network 108 (e.g., a WAN, the Internet, a cellular network, and/or the like). For example, the communication interface 126 may include a Wi-Fi transceiver for communicating via a wireless communications network. In another example, the communication interface 126 may include an Ethernet card and port for sending and receiving data via an Ethernet-based communications link or network. In another example, the communication interface 126 may include cellular or mobile phone communications transceivers. In various embodiments, the communication interface 126 may support various suitable protocols (e.g., TCP/IP, User Datagram Protocol UDP, Hypertext Transfer Protocol HTTP, Internet Message Access Protocol IMAP, Simple Mail Transfer Protocol SMTP, and/or the like) and/or data communication interfaces (e.g., Application Program Interface API, Web Services, and/or the like) for facilitating data communications with the webpage server 104, the application/web server 106, and/or the like.

The communications network 108 may include any suitable wired or wireless network (e.g., a Local Area Network (LAN), a Wide Area Network (WAN), cellular communications network, and/or the like). For example, the network 108 may include Frequency Division Multiple Access (FDMA), Time Division Multiple Access (TDMA), Code Division Multiple Access (CDMA) (e.g., Evolution-Data Optimized (EVDO)), Universal Mobile Telecommunications Systems (UMTS) (e.g., Time Division Synchronous CDMA (TD-SCDMA or TDS)), Wideband Code Division Multiple Access (WCDMA), Long Term Evolution (LTE), evolved Multimedia Broadcast Multicast Services (eM-BMS), High-Speed Downlink Packet Access (HSDPA), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, Wi-Fi, any suitable wired network, combinations thereof, and/or the like.

Figure 2:
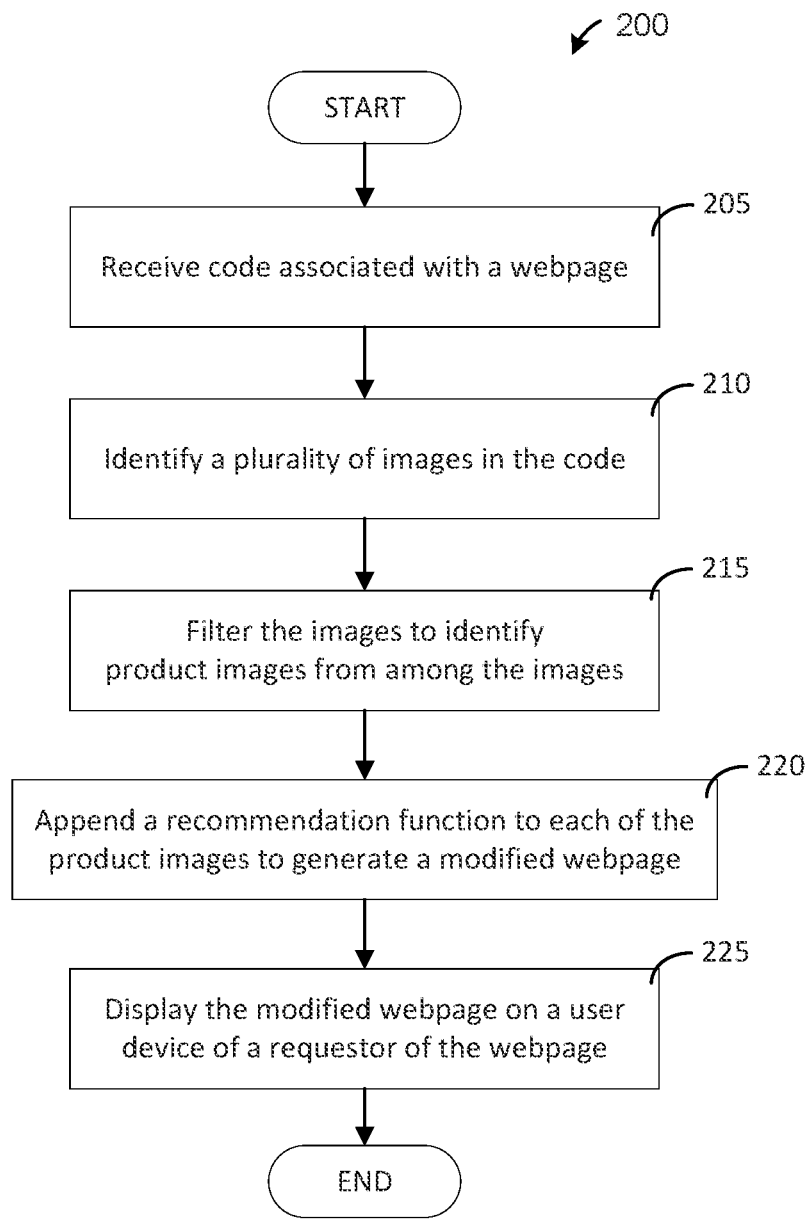
FIG. 2 illustrates a flow diagram of a method of appending a recommendation function on a product image contained in a requested webpage according to one or more embodiments of the present disclosure.
Figure 3A:
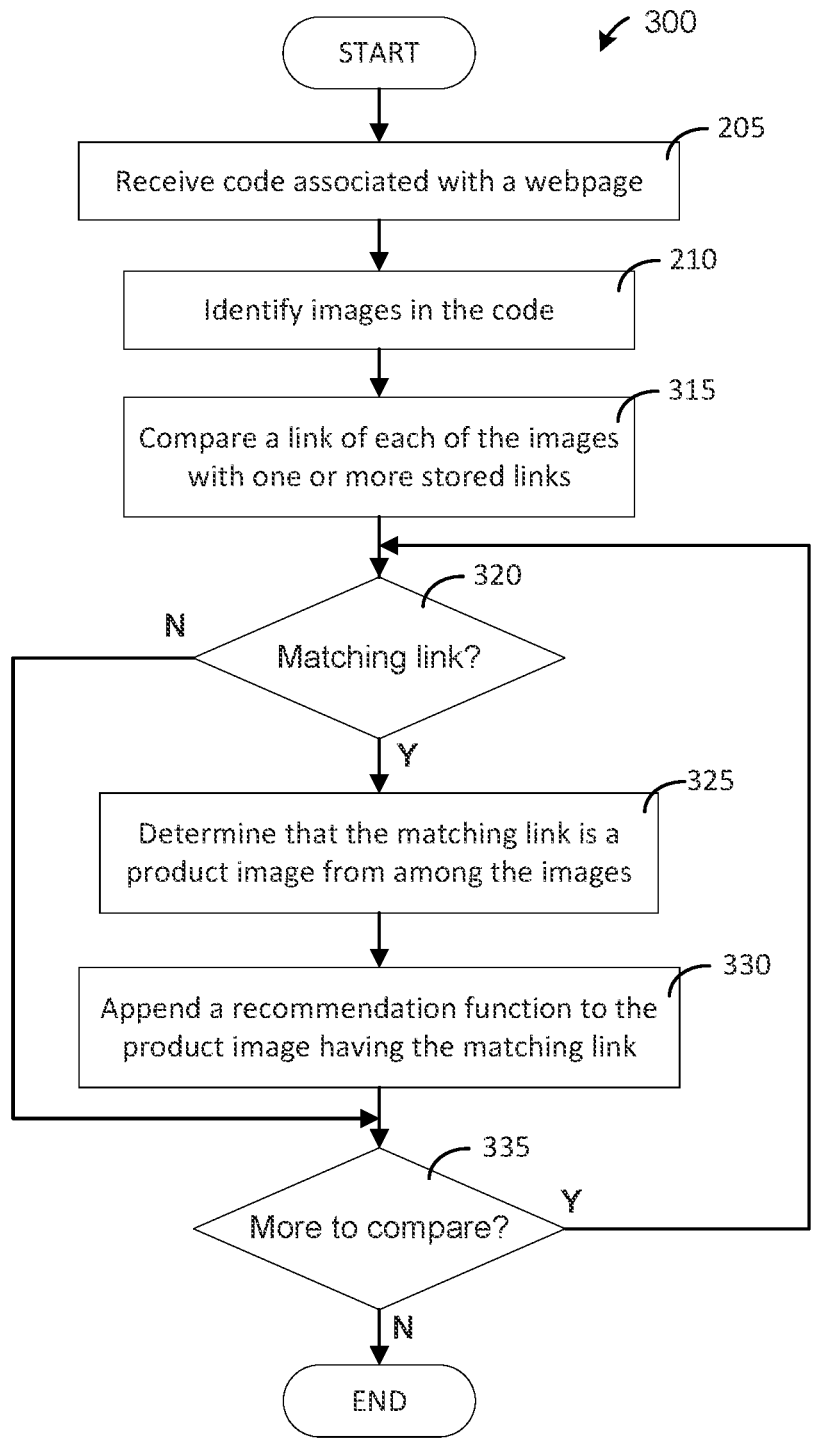
FIGS. 3A-3B illustrate methods of identifying a product image from among various images contained in the requested webpage according to one or more embodiments of the present disclosure.
Figure 3B:
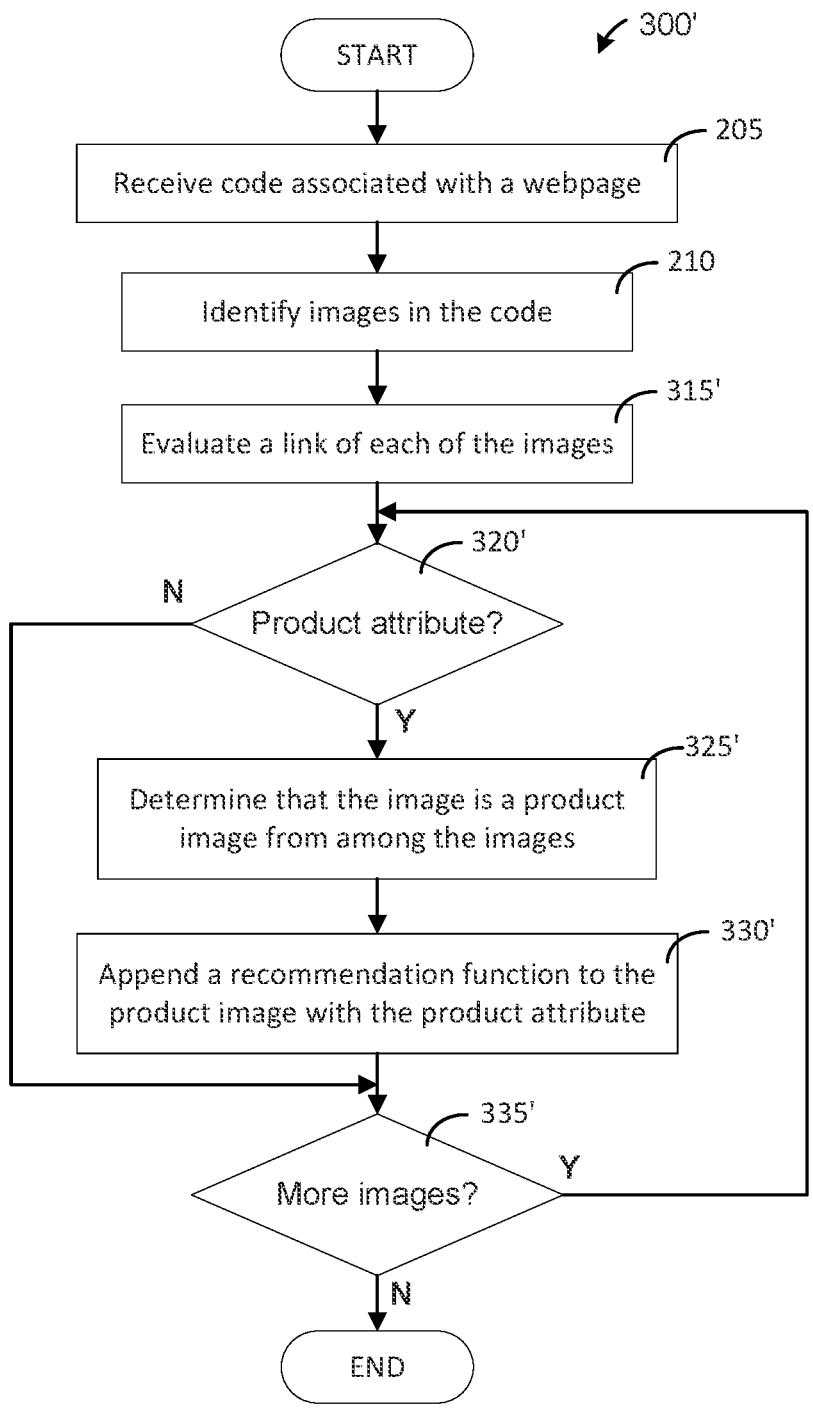
Figure 4:
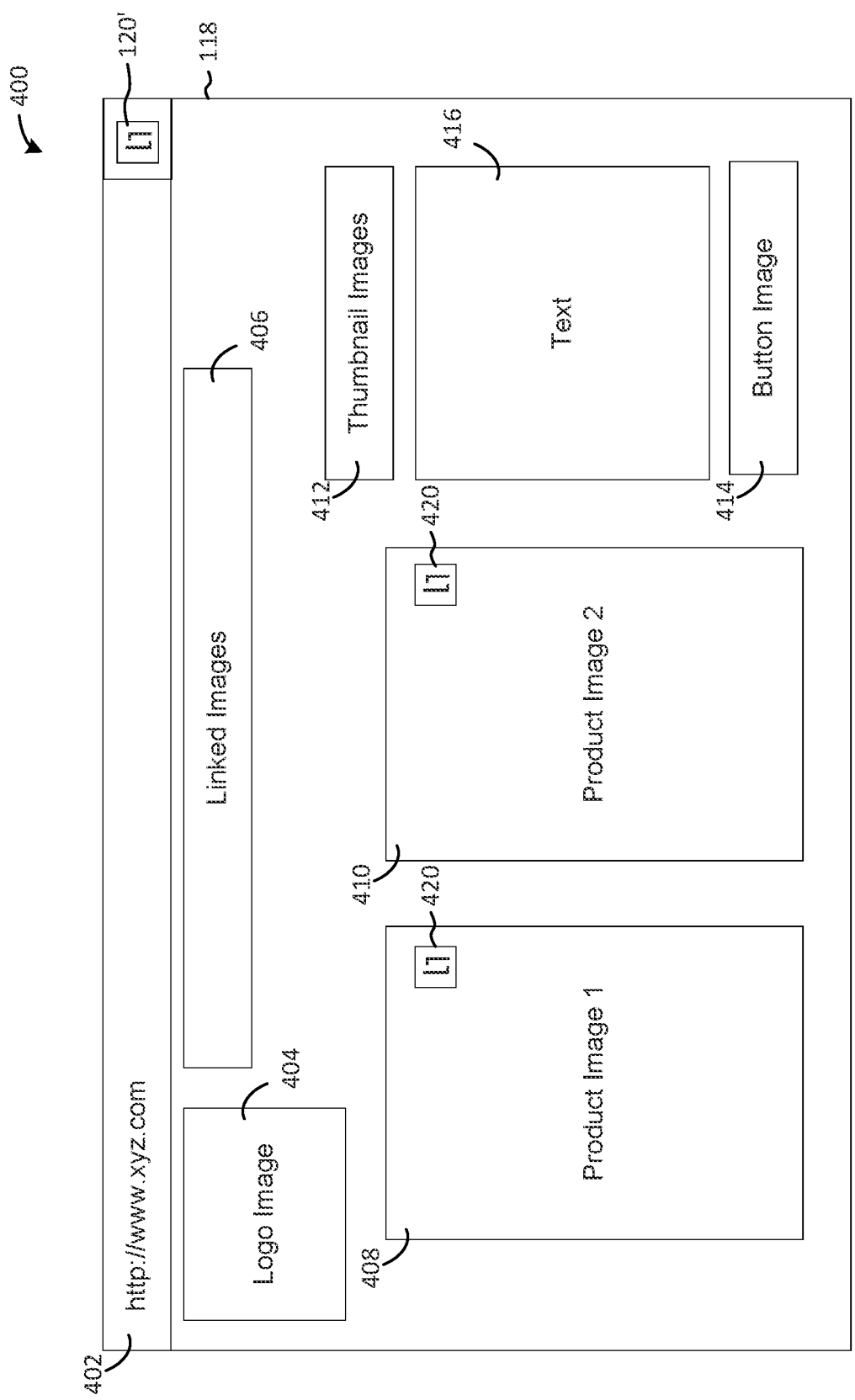
FIG. 4 illustrates a schematic diagram of a modified webpage including the recommendation function appended to a product image according to one or more embodiments of the present disclosure.

FIG. 2 illustrates a flow diagram of a method of appending a recommendation function on a product image contained in a requested webpage according to one or more embodiments of the present disclosure. FIGS. 3A through 3B illustrate methods of identifying a product image from among various images contained in the requested webpage according to one or more embodiments of the present disclosure. FIG. 4 illustrates a schematic diagram of a modified webpage including the recommendation function appended to a product image according to one or more embodiments of the present disclosure.

The methods 200, 300, and 300' shown in FIGS. 2 through 3B may be performed, for example, by the product image extractor 122 of the browser extension/plugin 120 shown in FIG. 1. However, the present disclosure is not limited thereto, and the operations shown in the methods 200, 300, and 300' may be performed by any suitable one of the components and elements or any suitable combination of the components and elements of those of one or more example embodiments described above. Further, the present disclosure is not limited to the sequence or number of the operations of the methods 200, 300, and 300' shown in FIGS. 2 through 3B, and can be altered into any desired sequence or number of operations as recognized by a person having ordinary skill in the art. For example, in some embodiments, the order may vary, or the methods 200, 300, and 300' may include fewer or additional operations. Further, the operations shown in the methods 200, 300, and 300' may be performed sequentially, or at least some of the operations thereof may be performed concurrently (e.g., simultaneously or substantially simultaneously).

Referring to FIGS. 1 through 4, the method 200 may start, and code associated with a requested webpage 400 may be received at block 205. For example, in some embodiments, the browser 118 may communicate with a webpage server 104 to request the code (e.g., the HTML and/or XML) associated with the webpage 400, for example, in response to a user of the user device 102 providing a URL or IP address associated with the webpage 400 in a browser bar or search bar 402 of the browser 118, such that the product image extractor 122 may receive the code (e.g., via HTTP POST) from the webpage server 104 at block 205.

The webpage 400 may include various images 404, 406, 408, 410, 412, and 414, and text 416. The webpage 400 may further include other various content, for example, such as videos, audios, buttons, links, and/or the like. The images 404, 406, 408, 410, 412, and 414 may be included in the code as URLs or other suitable links, such that the browser 118 when translating the code may retrieve each of the images 404, 406, 408, 410, 412, and 414 according to their URLs or other links.

In response to receiving the code at block 205, the plurality of images 404, 406, 408, 410, 412, and 414 contained in the code may be identified at block 210. For example, the product image extractor 122 may identify each of the images 404, 406, 408, 410, 412, and 414 via a corresponding image tag, attribute, image file extension, and/or the like contained in the code. The images 404, 406, 408, 410, 412, and 414 may be filtered to identify product images (e.g., 408 and 410) from among the images 404, 405, 408, 410, 412, and 414 at block 215. For example, as will be described in more detail below with reference to FIGS. 3A and 3B, the product image extractor 122 may identify the product images 408 and 410 from among the images 404, 405, 408, 410, 412, and 414 contained in the code of the webpage by comparing a link of each of the images with one or more stored links according to the method 300, or by a product identifier or attribute associated with the product images 408 and 410 in the code according to the method 300'.

In response to determining the product images 408 and 410 from among the images 404, 405, 408, 410, 412, and 414 contained in the code, a recommendation function 420 may be appended to each of the product images 408 and 410 to generate a modified webpage 400 at block 220. For example, in some embodiments, the product image extractor 122 may overlay the recommendation function 420 (e.g., an icon, a link, a button, and/or the like) on each of the product images 408 and 410 at block 220 to generate the modified webpage 400 shown in FIG. 4. The modified webpage 400 may be displayed on the user device 102 of a requestor of the webpage 400 at block 225, and the method 200 may end. For example, the browser 118 may display the modified webpage 400 including the overlaid recommendation function 420 on the display device 110 associated with the user device 102 at block 225.

In various embodiments, as briefly described above, the product image extractor 122 may identify the product images 408 and 410 from among the images 404, 405, 408, 410, 412, and 414 contained in the code of the webpage by comparing a link of each of the images with one or more stored links according to the method 300 shown in FIG. 3A, or by a product identifier or attribute associated with the product images 408 and 410 in the code according to the method 300' shown in FIG. 3B. In the methods 300 and 300', operations or processes that are the same or substantially the same as those described above with reference to the method 200 of FIG. 2 are designated with the same reference symbols, and thus, redundant description thereof may not be repeated.

First, referring to the method 300 of FIG. 3A, in some embodiments, the filtering of the images at block 215 of the method 200 may include comparing a link of each of the images 404, 405, 408, 410, 412, and 414 with one or more stored links at block 315 to determine whether any of the links are a matching link with the one or more stored links at block 320. For example, in some embodiments, the product image extractor 122 may compare the URL or other suitable link of each of the images 404, 405, 408, 410, 412, and 414 with URLs or other links stored in a data store. In an embodiment, the data store may be included on the user device 102, for example, as a list, a script, and/or the like accessible or executed by the product image extractor 122. In another embodiment, the data store may be a datacenter, a database, a storage device, memory, and/or the like of the application/web server 106, such that the product image extractor 122 may communicate with the application/web server 106 to access the stored links.

If a compared link matches one of the stored links (e.g., Yes Y) at block 320, then the image with the matching link may be determined to be a product image (e.g., 408 or 410) from among the images 404, 405, 408, 410, 412, and 414 at block 325, and thus, the requested webpage may also be determined to be a product webpage. Thus, a recommendation function may be appended to the product image with the matching link at block 330, for example, as described above with reference to block 220 of the method 200 of FIG. 2, and a determination may be made whether there are any more image links to be compared at block 335. If there are more image links to be compared at block 335, the method 300 may continue by determining whether the other image links are a matching link at block 320.

Similarly, if a compared link does not match any of the stored links (e.g., No N) at block 320, then the product image extractor 122 may determine whether there are any more image links to be compared at block 335. If there are no more links to compare at block 335 (e.g., No N), then the method 300 may end, such that the modified webpage 400 including the recommendation function 420 overlaid on the product images 408 and 410 may be displayed on the display device 110 of the user device 102 (e.g., via the browser 118) as shown in FIG. 4.

Referring to the method 300' of FIG. 3B, in some embodiments, the filtering of the images at block 215 of the method 200 may include evaluating a link of each of the images 404, 405, 408, 410, 412, and 414 at block 315' to determine whether any of the image links contain a product attribute at block 320'. For example, in some embodiments, the product image extractor 122 may evaluate (e.g., parse, extract, and/or the like) each of the image links to identify a product attribute contained therein. The product attribute may include a keyword, a directory, a name or identifier of a product, a product image tag, and/or the like.

If an image link contains a product attribute (e.g., Yes Y) at block 320', then the image with the product attribute may be presumed to be a product image (e.g., 408 or 410) from among the images 404, 405, 408, 410, 412, and 414 at block 325', and thus, the requested webpage may also be determined to be a product webpage. Thus, a recommendation function may be appended to the product image with the product attribute at block 330', for example, as described above with reference to block 220 of the method 200 of FIG. 2, and a determination may be made whether there are any more image links to evaluate at block 335'. If there are more image links to evaluate at block 335', the method 300' may continue by evaluating the other image links at block 320'.

Similarly, if an evaluated link does not contain a product attribute (e.g., No N) at block 320', then the product image extractor 122 may determine whether there are any more image links to evaluate at block 335'. If there are no more links to evaluate at block 335' (e.g., No N), then the method 300' may end, such that the modified webpage 400 including the recommendation function 420 overlaid on the product images 408 and 410 may be displayed on the display device 110 of the user device 102 (e.g., via the browser 118) as shown in FIG. 4.

Figure 5:
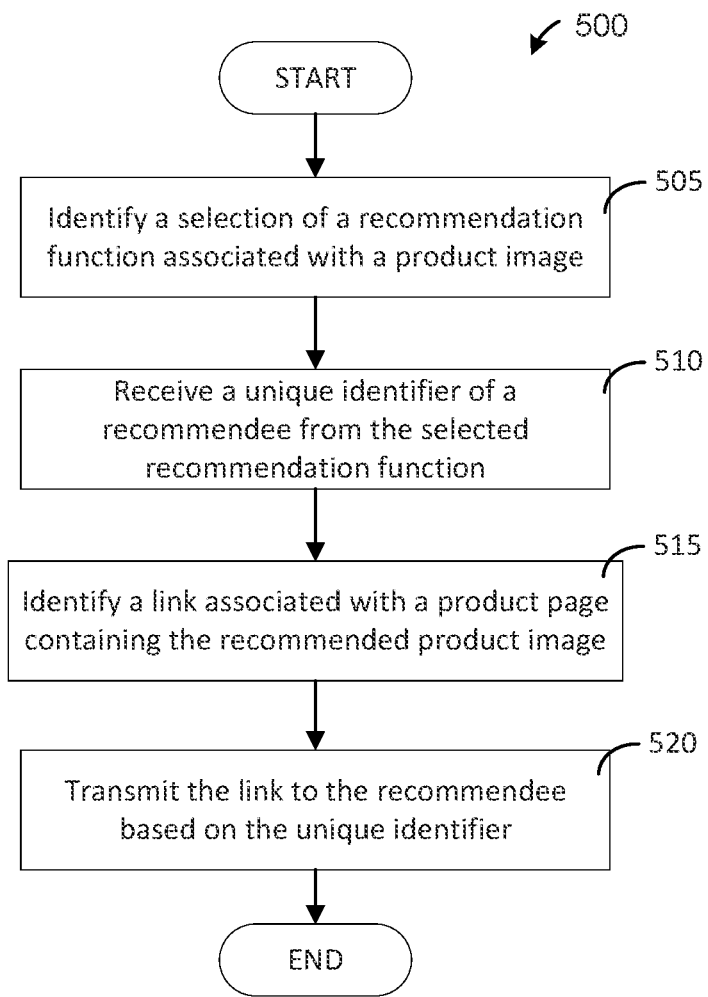
FIG. 5 illustrates a flow diagram of a method of recommending a product image contained in a product webpage according to one or more embodiments of the present disclosure.
Figure 6:
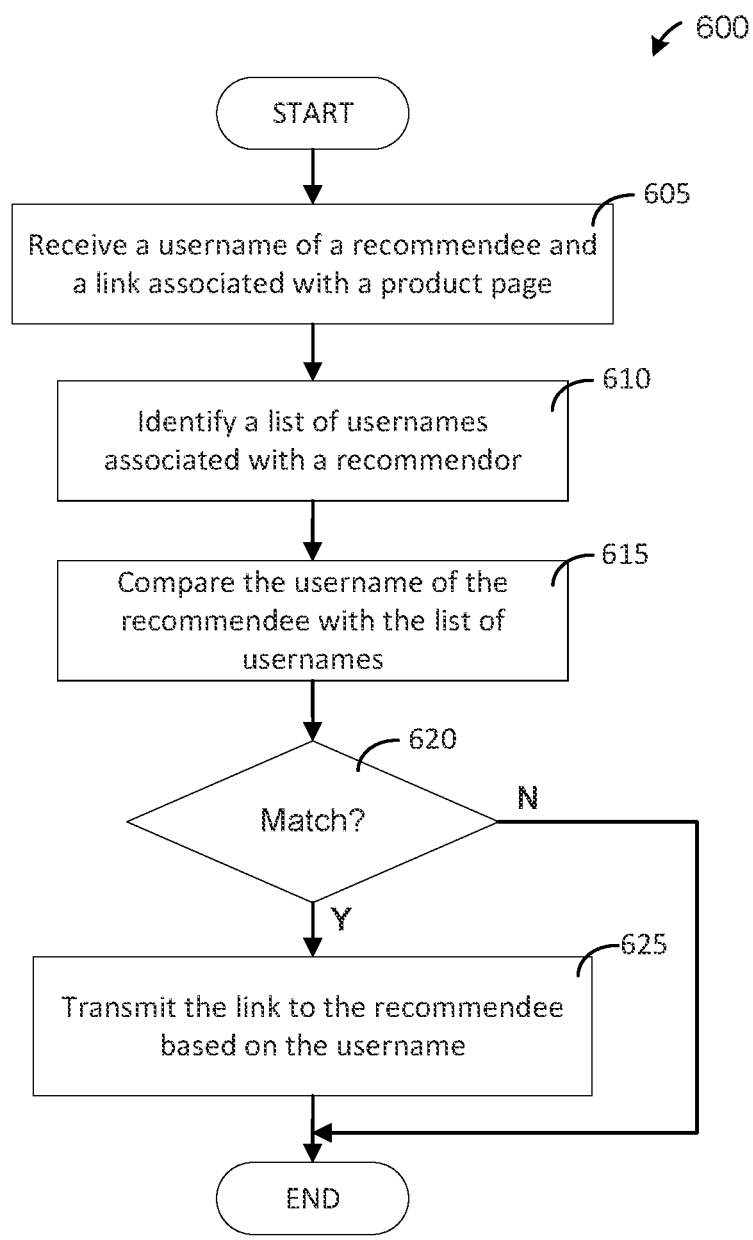
FIG. 6 illustrates a flow diagram of a method of identifying a recommendee according to one or more embodiments of the present disclosure.
Figure 7A:
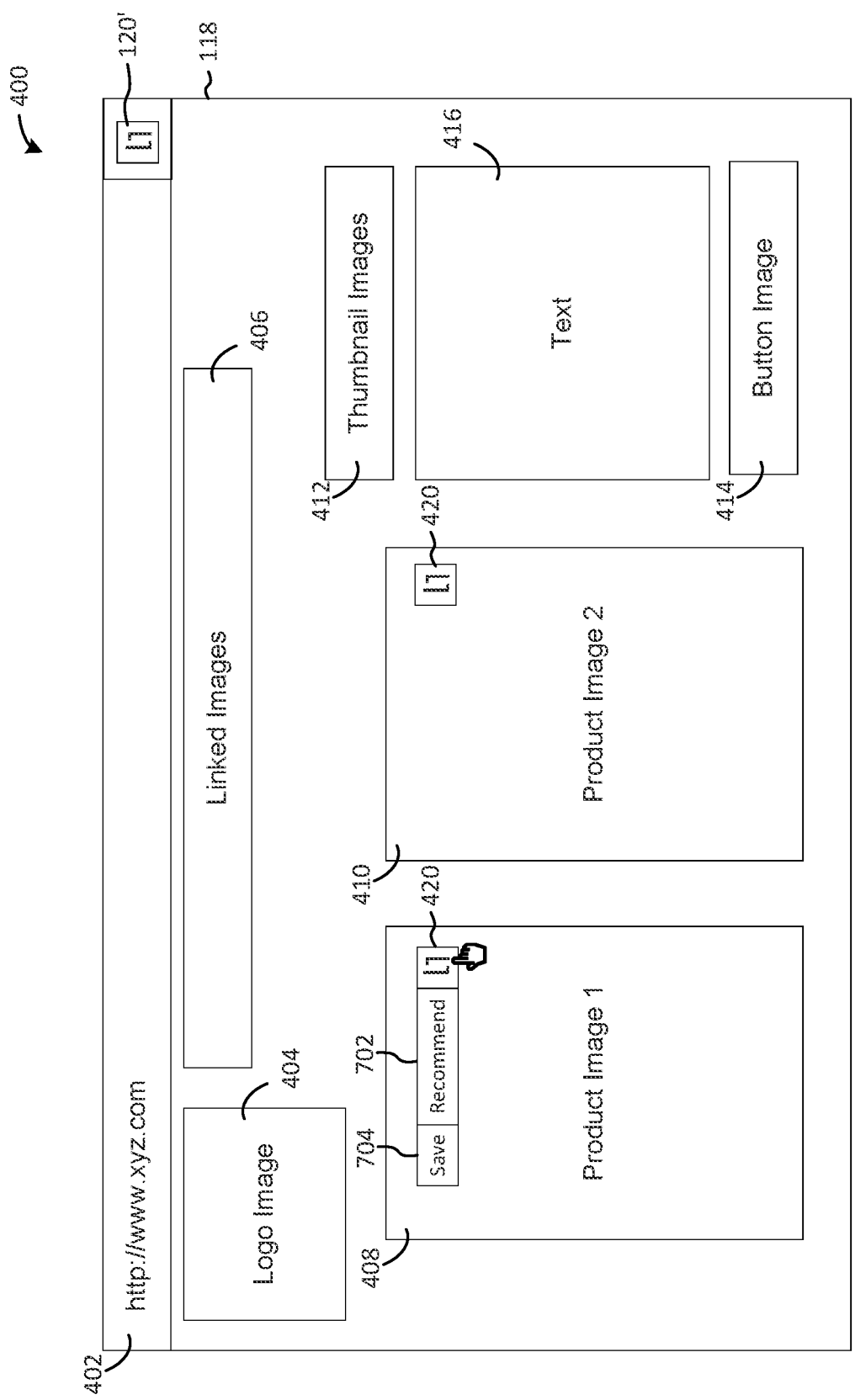
FIGS. 7A-7B illustrate schematic diagrams of a method of recommending a product image contained in a product webpage according to one or more embodiments of the present disclosure.
Figure 7B:
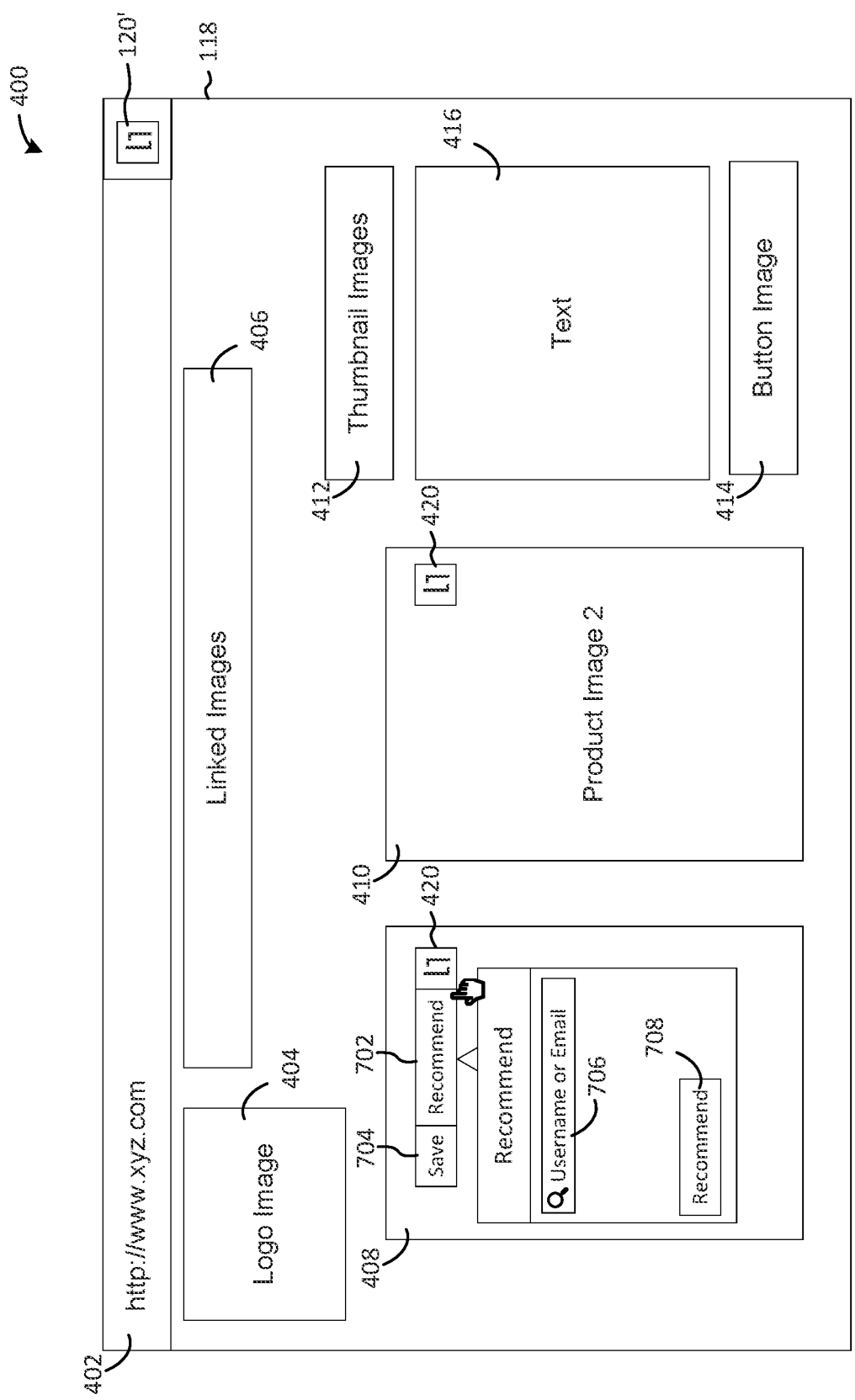

FIG. 5 illustrates a flow diagram of a method of recommending a product image contained in a product webpage according to one or more embodiments of the present disclosure. FIG. 6 illustrates a flow diagram of a method of identifying a recommendee according to one or more embodiments of the present disclosure. FIGS. 7A through 7B illustrate schematic diagrams of a method of recommending a product image contained in a product webpage according to one or more embodiments of the present disclosure.

The methods 500 and 600 shown in FIGS. 5 and 6 may be performed, for example, by the recommendation service 124 of the browser extension/plugin 120 and/or a processing circuit including a processor (e.g., a general purpose processor) of the application/web server 106 shown in FIG. 1. However, the present disclosure is not limited thereto, and the operations shown in the methods 500 and 600 may be performed by any suitable one of the components and elements or any suitable combination of the components and elements of those of one or more example embodiments described above. Further, the present disclosure is not limited to the sequence or number of the operations of the methods 500 and 600 shown in FIGS. 5 and 6, and can be altered into any desired sequence or number of operations as recognized by a person having ordinary skill in the art. For example, in some embodiments, the order may vary, or the methods 500 and 600 may include fewer or additional operations. Further, the operations shown in the methods 500 and 600 may be performed sequentially, or at least some of the operations thereof may be performed concurrently (e.g., simultaneously or substantially simultaneously).

Referring to FIGS. 1 and 5 through 7B, the method 500 may start, and a selection of a recommendation function associated with a product image may be identified at block 505. For example, in some embodiments, the user may select (e.g., click or hover over) a recommendation function 420 that has been appended to a product image 408 (e.g., by the product image extractor 122), such that the recommendation function 420 may be expanded to show a recommend link 702, which may reveal a form or search bar 706 and an input button 708. Accordingly, a unique identifier of a recommendee may be received from the selected recommendation function at block 510. For example, the user may input a username or an email of the recommendee via the search bar 706, and may submit the unique identifier of the recommendee by clicking on the input button 708.

In some embodiments, if the user has a list of potential recommendees (e.g., friends or followers) already established, the recommendation service 124 may communicate with the application/web server 106 to retrieve the list of potential recommendees, such that when the user selects or hovers over the search bar 706, the list of potential recommendees may be provided via a dropdown, and the user may select a username of one or more of the potential recommendees from the dropdown.

In response to receiving the unique identifier of the recommendee at block 510, a link associated with a product webpage containing the recommended product image may be identified at block 515. For example, in some embodiments, the recommendation service 124 may identify the URL of the webpage 400 containing the recommended product image 408. The link of the product page may be transmitted to the recommendee based on the unique identifier at block 520, and the method 500 may end. For example, in some embodiments, the recommendation service 124 may transmit the link of the webpage 400 containing the recommended product image 408 and the unique identifier of the recommendee to the application/web server 106 for further processing.

In some embodiments, the recommendation service 124 may further transmit the link of the recommended product image to the application/web server 106 to save and/or transmit the product image to the recommendee. In some embodiments, the application/web server 106 may transmit the recommendation (including the link to the product page and/or the recommended product image) to the recommendee as will be discussed in more detail below with reference to FIG. 6. However, the present disclosure is not limited thereto, and in other embodiments, the recommendation service 124 may directly transmit the recommendation to the recommendee based on the unique identifier, or may transmit the recommendation to another application (e.g., an email application, messaging application, and/or the like) to be transmitted to the recommendee based on the unique identifier.

Referring to the method 600 of FIG. 6, in some embodiments, a username of a recommendee and a link associated with a product page may be received at block 605. For example, the application/web server 106 may receive the username and the link associated with the product page from the recommendation service 124. In some embodiments, the application/web server 106 may further receive a link associated with the recommended product image from the recommendation service 124.

In some embodiments, a list of usernames associated with a recommendor may be identified at block 610, and may be compared with the username received from the recommendor at block 615. For example, in some embodiments, the application/web server 106 may compare the received username with the list of usernames associated with the recommendor to determine whether the recommendor knows or is friends with the recommendee, or whether the recommendee follows the recommendor. Thus, if there is a match at block 620 (e.g., yes Y), then the application server 106 may transmit the recommendation to the recommendee based on the user name at block 625, and the method 600 may end. On the other hand, if there is no match at block 620 (e.g., No N), then the application server 106 may not transmit the recommendation to the recommendee, and the method 600 may end. For example, in some embodiments, if there is no match at block 620, the application/web server 106 may not process the recommendation, and no notification may be sent to the recommendor. As another example, in some embodiments, in response to no match at block 620, the application/web server 106 may transmit a notification to the recommendation service 124 indicating that the recommendor is not authorized to transmit the recommendation to the recommendee, such that the recommendation service 124 may inform the recommendor that the recommendation was denied. Accordingly, in some embodiments, the user may be prevented from transmitting (e.g., spamming) recommendations to unknown users.

While the method 600 is described with reference to a username of the recommendee as the unique identifier of the recommendee, the present disclosure is not limited thereto, and in other embodiments, instead of the username, the email of the recommendee may be used as the unique identifier in the method 600. In another embodiment, if the user is aware of the email of the recommendee, the application/web server 106 may assume that the user knows the recommendee, and thus, may still transmit the recommendation to the recommendee based on the email, even if the email is not recognized (e.g., such as if the recommendee is not a registered user).

Figure 8A:
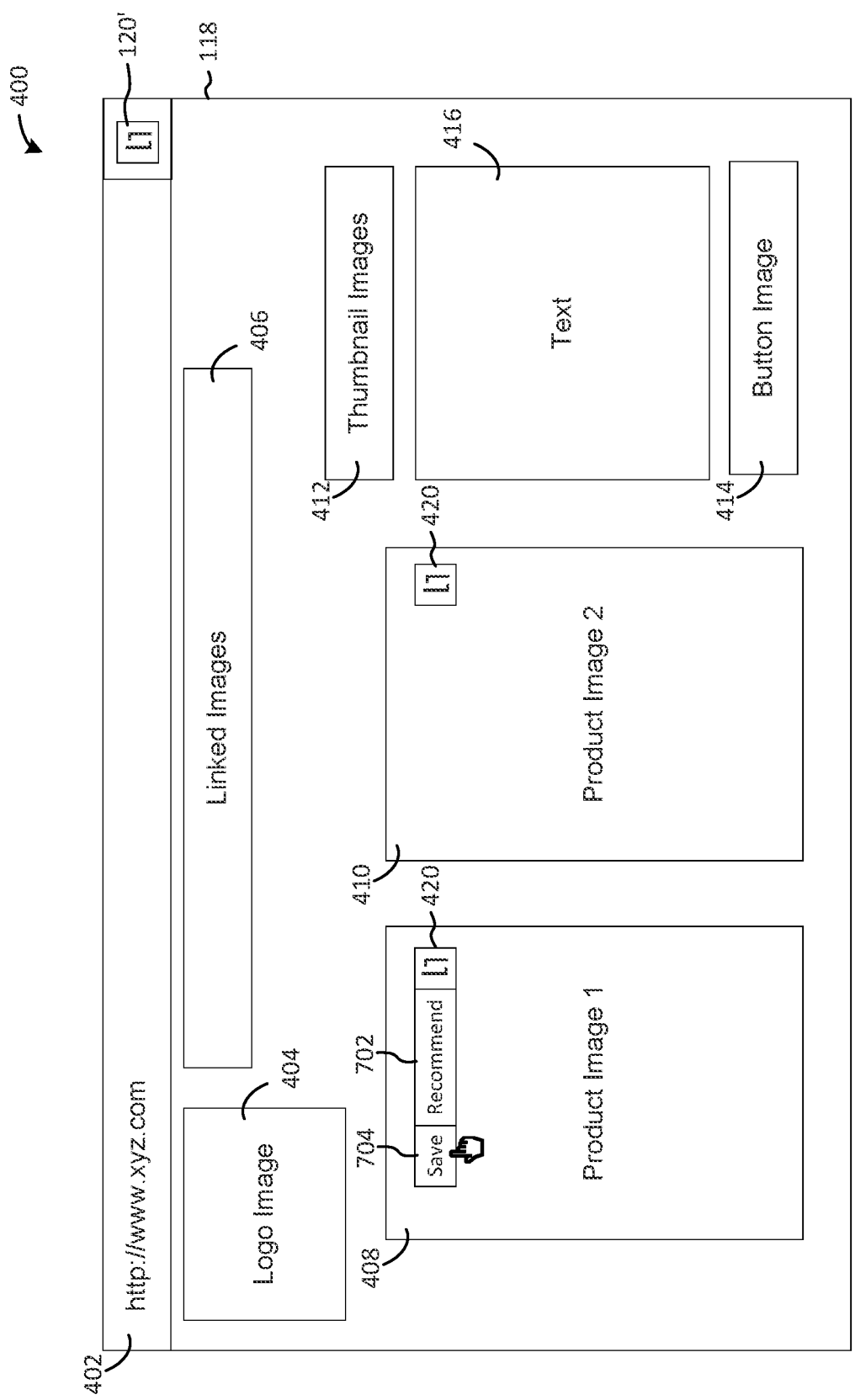
FIGS. 8A-8C illustrate schematic diagrams of a method of saving a product image contained in a product webpage according to one or more embodiments of the present disclosure.
Figure 8B:
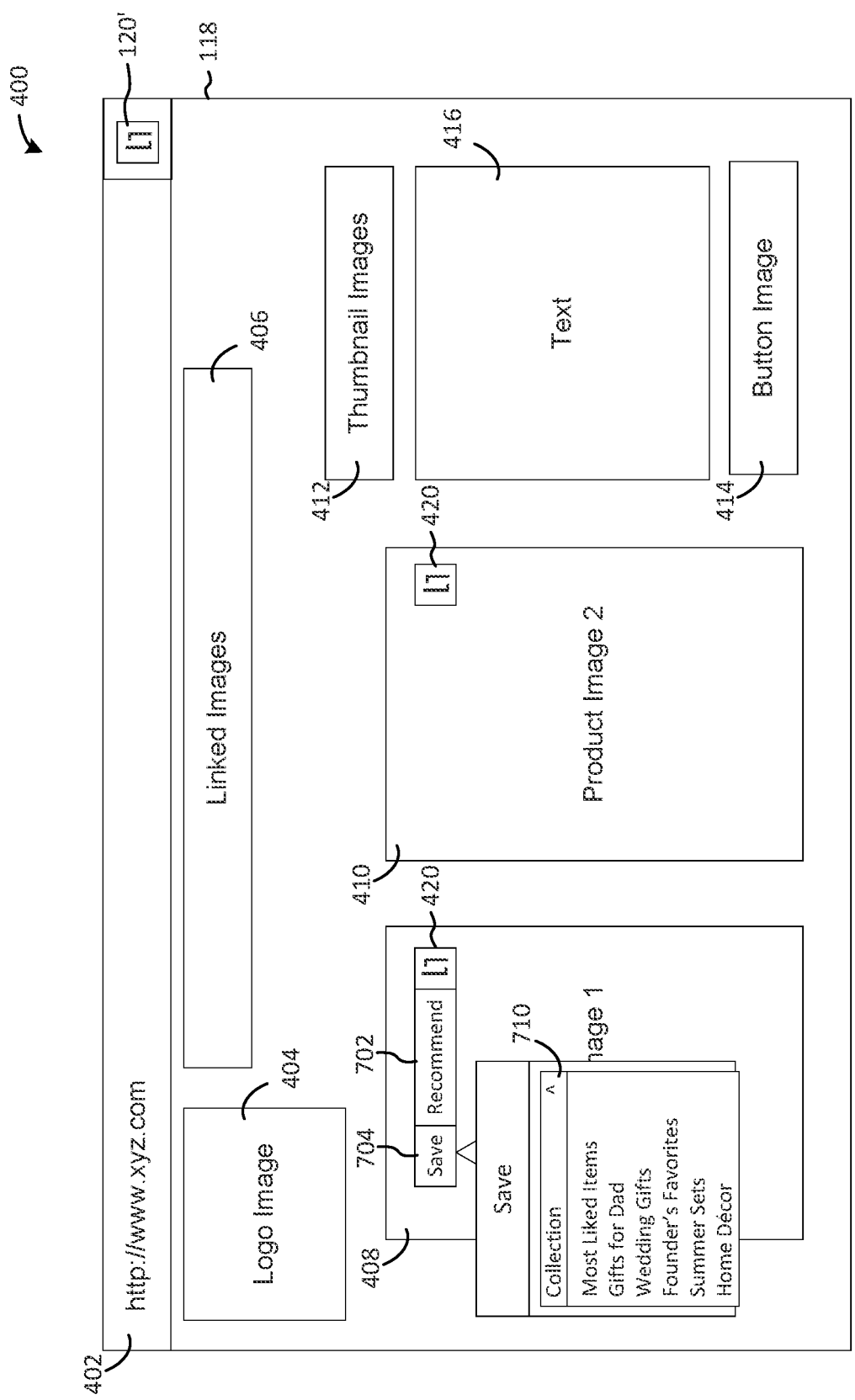
Figure 8C:
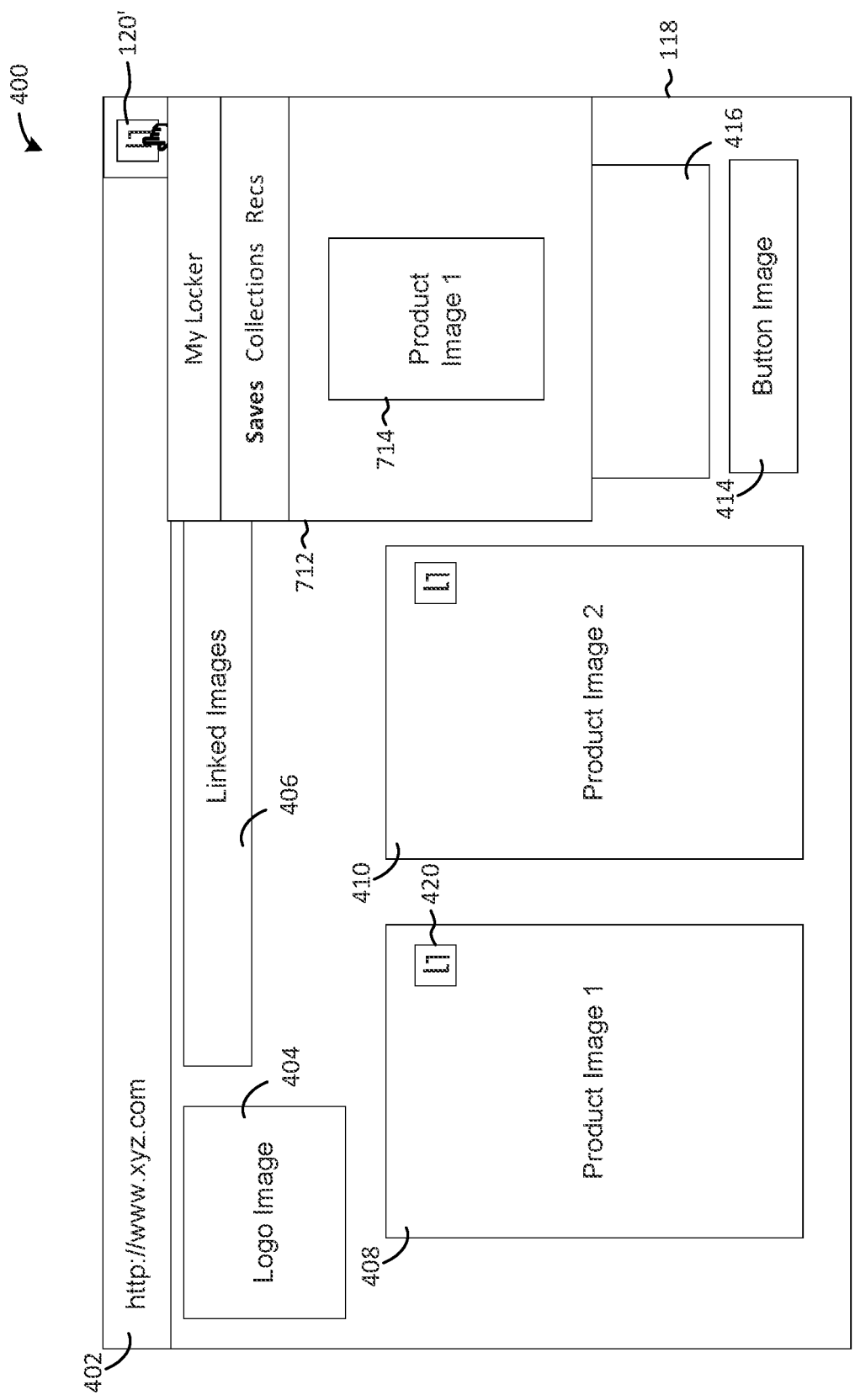

FIGS. 8A through 8C illustrate schematic diagrams of a method of saving a product image contained in a product webpage according to one or more embodiments of the present disclosure.

Referring to FIGS. 8A through 8C, in some embodiments, the recommendation function 420 may further enable a user to save a product image of a product webpage for later retrieval. For example, in some embodiments, a selected recommendation function 420 that has been appended to a product image 408 (e.g., by the product image extractor 122) may further expand a save link 704, such that when the user clicks on the save link 704, a link of the product image 408 and/or a link of the product webpage 402 may be transmitted (e.g., by the recommendation service 124) to be saved to the user's account with the application/web server 106.

In some embodiments, when the user clicks on or hovers over the save link 704, a collection dropdown 710 may be provided, such that the user may save the product image and/or the link of the product webpage in a particular collection. The collections may be predefined and/or user defined, and may enable the user to organize the saved product images into different categories as needed or desired.

In some embodiments, when the extension/plugin 120 is installed, an extension/plugin button 120' may be added to the browser 119 (e.g., to a browser bar). The extension/plugin button 120' may communicate with the application/web server 106 (e.g., via the recommendation service 124) to retrieve user activity information (e.g., saved product images, recommendations, collections, and/or the like) 712, such that the extension/plugin button 120' may display (e.g., via a popup, a dropdown, and/or the like) the user activity information 712, without requiring the user to visit the application page, webpage, dashboard, user interface, and/or the like hosted by the application/web server 106 in order to view the user activity information 712. For example, in some embodiments, the user activity information 712 may include a thumbnail image 714 of the saved product image 408, and the thumbnail image 714 may be linked to the product webpage 400 containing the saved product image 408, such that the user may revisit the product webpage 400 by clicking or otherwise selecting the thumbnail image 714.

In some embodiments, the extension/plugin button 120' may enable the user to manage (e.g., to modify and/or delete) the user activity information 712. For example, when the user clicks or hovers over the extension/plugin button 120', the user activity information 712 may be exposed to enable the user to view and manage the user activity information 712. In some embodiments, when the user modifies and/or deletes any of the user activity information 712 from the extension/plugin button 120', the extension/plugin button 120' may inform the application/web server 106 (e.g., via the recommendation service 124), such that any updated user activity information 712 may be synchronized to the application/web server 106.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A system for adding an external function to a webpage, comprising:
   one or more processors; and
   memory communicably connected to the one or more processors and storing instructions that, when executed by the one or more processors, cause the one or more processors to:
   receive code associated with the webpage from a remote server;
   identify a plurality of images in the code;
   filter the plurality of images, based on a plurality of links of the plurality of images, to identify a first type of image different from other images of the plurality of images;
   append the external function to the first type of image to display a modified webpage including the external function on a display device of a first user;
   receive a first selection of the external function appended to the first type of image in the modified webpage;
   present a plurality of collections in response to the first selection of the external function;
   receive a selected collection from among the plurality of collections;
   identify a link of a webpage associated with the first type of image;
   store the link of the webpage associated with the first type of image in the selected collection from among the plurality of collections;
   receive a second selection of the external function appended to the first type of image in the modified webpage;
   present a solicitation for a unique identifier for a second user in response to the second selection of the external function;
   receive the unique identifier for the second user;
   identify an image link of the first type of image and the link of the webpage associated with the first type of image; and
   transmit a recommendation including the first type of image and the link of the webpage associated with the first type of image to the second user based on the unique identifier, the image link, and the link of the webpage associated with the first type of image,
   wherein, in response to a selection of the link of the webpage associated with the first type of image in the selected collection, the webpage associated with the first type of image is displayed, and
   wherein, in response to a selection of the recommendation including the first type of image and the link of the webpage associated with the first type of image that is transmitted to the second user, the webpage associated with the first type of image is displayed.

2. The system of claim 1, wherein to filter the plurality of images, the instructions further cause the one or more processors to:
   compare a link of each of the plurality of images with one or more links stored in a data store;
   identify a matching link with the one or more links; and
   determine that an image associated with the matching link from among the plurality of images is the first type of image.

3. The system of claim 1, wherein to filter the images, the instructions further cause the one or more processors to:
   evaluate the plurality of links of the plurality of images;
   identify a product attribute contained in a link from among the plurality of links; and
   determine that an image associated with the link including the product attribute is the first type of image.

4. The system of claim 1, wherein the unique identifier comprises an email or a username associated with the second user.

5. The system of claim 1, wherein to receive the unique identifier of the second user, the instructions further cause the one or more processors to:
   identify a list of unique identifiers associated with the first user;
   display the list of unique identifiers in the presented solicitation; and
   receive a selection of the unique identifier of the second user from the list of unique identifiers.

6. The system of claim 1, wherein to receive the unique identifier of the second user, the instructions further cause the one or more processors to:
   identify a list of known unique identifiers associated with the first user;
   compare the received unique identifier with the list of known unique identifiers; and
   transmit the link to the second user in response to identifying a match of the received unique identifier with the list of known unique identifiers.

7. The system of claim 1, wherein the external function is a part of an extension or a plugin of a browser.

8. The system of claim 7, wherein the external function comprises a link to a functionality for the extension or plugin.

9. The system of claim 8, wherein the link comprises an icon appended to the first type of image.

10. A method for adding an external function to a webpage, comprising:
    receiving, by a processor comprising an internet browser, code associated with the webpage from a remote server;
    identifying, by the processor, a plurality of images in the code;
    filtering, by the processor, the plurality of images, based on a plurality of links of the plurality of images, to identify a first type of image different from other images of the plurality of images;
    appending, by the processor, the external function to the first type of image to display a modified webpage including the external function on a display device of a first user;
    receiving, by the processor, a first selection of the external function appended to the first type of image in the modified webpage;
    presenting, by the processor, a plurality of collections in response to the first selection of the external function;
    receiving, by the processor, a selected collection from among the plurality of collections;

identifying, by the processor, a link of a webpage associated with the first type of image;

storing, by the processor, the link of the webpage associated with the first type of image in the selected collection from among the plurality of collections;

receiving, by the processor, a second selection of the external function appended to the first type of image in the modified webpage;

presenting, by the processor, a solicitation for a unique identifier for a second user in response to the second selection of the external function;

receiving, by the processor, the unique identifier for the second user;

identifying, by the processor, an image link of the first type of image and the link of the webpage associated with the first type of image; and transmitting, by the processor, a recommendation including the first type of image and the link of the webpage associated with the first type of image to the second user based on the unique identifier, the image link, and the link of the webpage associated with the first type of image, wherein, in response to a selection of the link of the webpage associated with the first type of image in the selected collection, the webpage associated with the first type of image is displayed, and wherein, in response to a selection of the recommendation including the first type of image and the link of the webpage associated with the first type of image that is transmitted to the second user, the webpage associated with the first type of image is displayed.

11. The method of claim 10, wherein the filtering of the plurality of images comprises:

comparing, by the processor, a link of each of the plurality of images with one or more links stored in a data store;

identifying, by the processor, a matching link with the one or more links; and determining, by the processor, that an image associated with the matching link from among the plurality of images is the first type of image.

12. The method of claim 10, wherein the filtering of the images comprises:

evaluating, by the processor, the plurality of links of the plurality of images;

identifying, by the processor, a product attribute contained in a link from among the plurality of links; and determining, by the processor, that an image associated with the link including the product attribute is the first type of image.

13. The method of claim 10, wherein the unique identifier comprises an email or a username associated with the second user.

14. The method of claim 10, wherein the receiving of the unique identifier of the second user comprises:

identifying, by the processor, a list of unique identifiers associated with the first user;

displaying, by the processor, the list of unique identifiers in the presented solicitation; and receiving, by the processor, a selection of the unique identifier of the second user from the list of unique identifiers.

15. The method of claim 10, wherein the receiving of the unique identifier of the second user comprises:

identifying, by the processor, a list of known unique identifiers associated with the first user;

comparing, by the processor, the received unique identifier with the list of known unique identifiers; and transmitting, by the processor, the link to the second user in response to identifying a match of the received unique identifier with the list of known unique identifiers.

16. The method of claim 10, wherein the external function is a part of an extension or a plugin of the browser.

17. The method of claim 16, wherein the external function comprises a link to a functionality for the extension or plugin.

18. The method of claim 17, wherein the link comprises an icon appended to the first type of image.

* * * * *